Feb. 17, 1942.                F. W. KERNS                2,273,271
                APPARATUS FOR REMOVING SOLIDS FROM FLUIDS
                      Filed Dec. 28, 1940          3 Sheets-Sheet 1

INVENTOR.
Frank W. Kerns.
BY
Chas. E. Townsend.
ATTORNEYS.

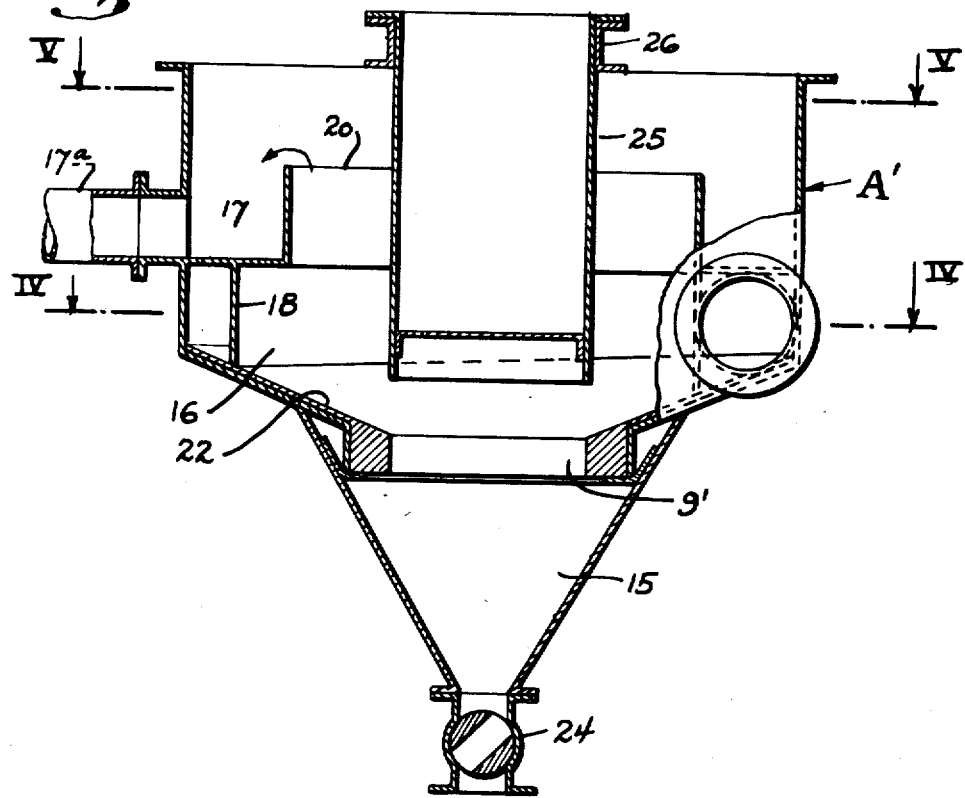
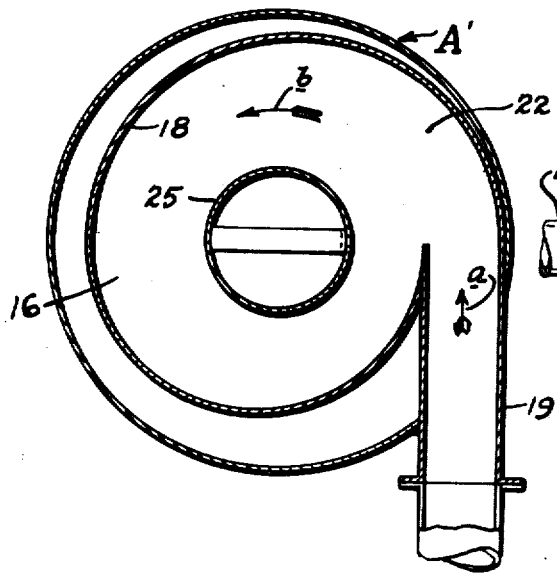
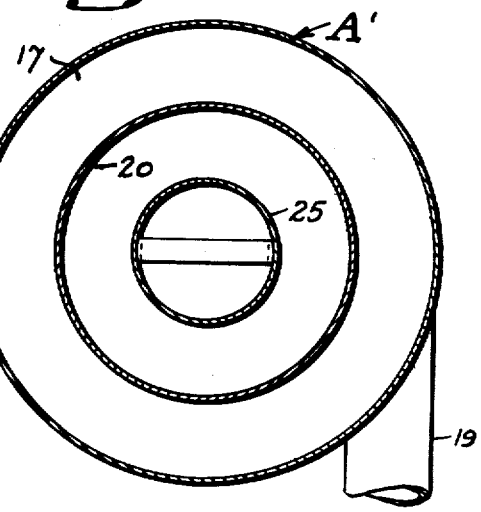

INVENTOR.
Frank W. Kerns,
BY
Chas. E. Townsend.
ATTORNEYS.

Patented Feb. 17, 1942

2,273,271

UNITED STATES PATENT OFFICE 2,273,271

APPARATUS FOR REMOVING SOLIDS FROM FLUIDS

Frank W. Kerns, Berkeley, Calif.

Application December 28, 1940, Serial No. 372,037

5 Claims. (Cl. 209—211)

This invention relates to a method and apparatus for removing solids from fluids, and particularly to improvements in the apparatus disclosed in my former Patents No. 1,880,185 issued September 27, 1932, and No. 2,012,567, issued August 27, 1935, the present application being a continuation in part of my application entitled "Method and apparatus for removing solids from fluids," filed December 21, 1938, Serial Number 247,042.

The object of the present invention is to provide an improved form of apparatus which permits separation or removal of solids from fluids maintained under low or high pressures; to provide an improved form of separating plate and a surrounding wall whereby uniform velocity of fluid may be maintained over substantially the entire area of the plate; to provide an improved form of apparatus in which both centripetal and gravitational forces are utilized to insure separation of solids from fluid; and further, to provide means for mechanically imparting rotational movement to the fluid with sufficient velocity to permit centripetal removal of solids where the velocity and quantity of incoming fluid to be treated is not sufficient to produce the required rotational movement and velocity.

The invention is shown by way of illustration in the accompanying drawings, in which—

Fig. 3 is a central vertical section of another form of the apparatus;

Fig. 4 is a cross section on line IV—IV of Fig. 3;

Fig. 5 is a cross section on line V—V of Fig. 3; and

Figure 1:
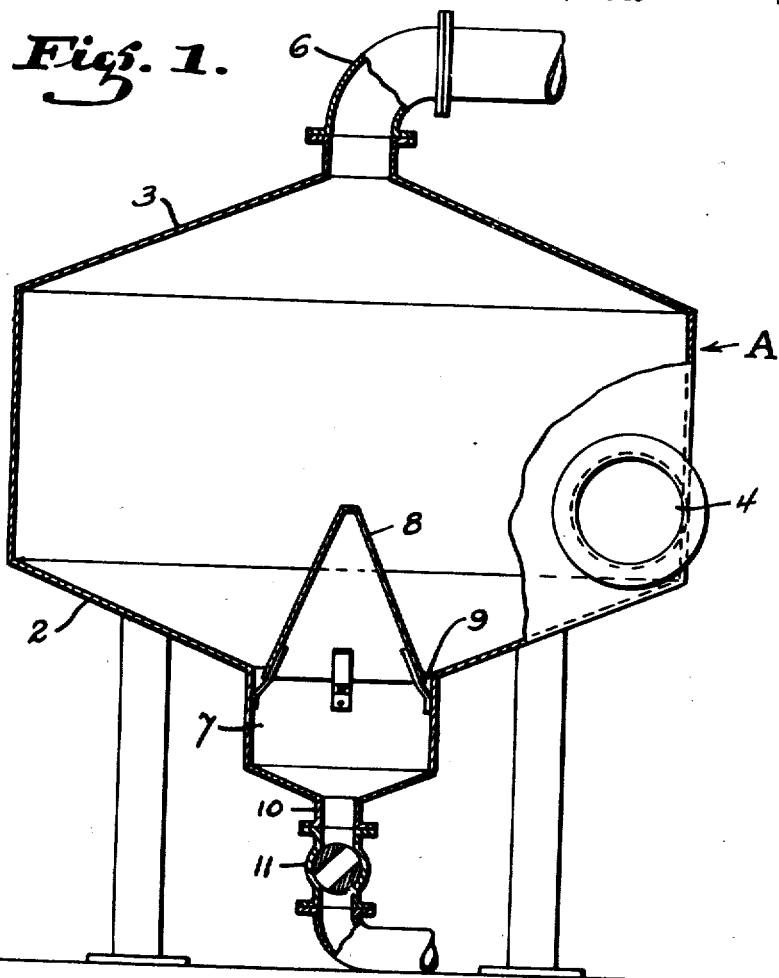
Fig. 1 is a central vertical section of one form of the apparatus.
Figure 2:
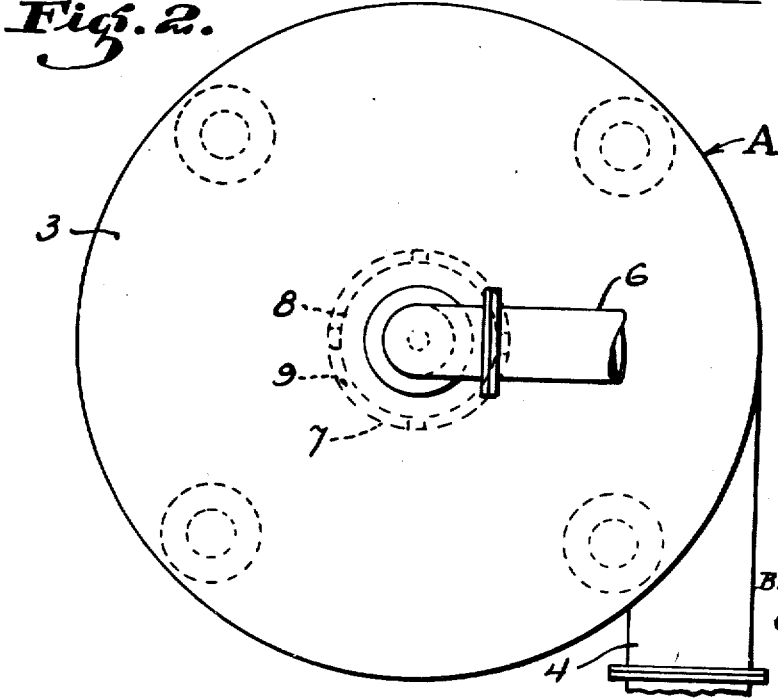
Fig. 2 is a plan view thereof.

Referring to the drawings in detail, and particularly to Figs. 1 and 2, A indicates in general a cylindrical form of tank or container, having a bottom 2 and a closure or cover 3. Formed at one side and adjacent the bottom is a tangentially disposed inlet 4, and in the upper part is a discharge connection in the form of a pipe or the like, as indicated at 6. Connected with the bottom section 2 is a lower housing having a chamber 7 formed therein which is provided for the settling and reception of the removed solids. Above this housing is mounted a cylindrical or cone-shaped member 8, between the base of which and the bottom 2 is formed an annular opening 9 through which the solids enter chamber 7. In the bottom of the housing 7 is a discharge pipe 10, and connected therewith is a valve 11 or other means which may be continuously or intermittently open, as conditions demand.

In actual practice the fluid or liquid to be treated enters through the tangentially disposed inlet 4, under sufficient velocity to cause rotation of the entire body of fluid within the container A. The broad idea of separating solids from water and other fluids by centripetal action has been clearly disclosed in my former patents referred to above. Nevertheless, it may be briefly stated that where a fluid flows through a circular or curved conduit, or through a cylindrically shaped container, such as here shown, there is downward flow along the outer wall and a cross or lateral flow across the bottom. The force of gravity causes solid matter to settle towards the bottom, and the down and crossflow causes the solids which have settled to travel inwardly towards the annular opening 9, where they enter the chamber 7 and settle. The liquid or fluid within the chamber 7 is maintained in a quiescent condition to permit free settling, and the settled matter thus separated from the flowing fluid may be periodically removed by intermittent opening of the valve 11, or continuous removal may be insured by maintaining the valve partially or fully open.

The bottom 2 of the main container may be flat, but a warped surface such as an inverted truncated cone is desirable, as the sloping bottom thus provided promotes gravitational discharge of the solids through the opening 9 into the lower container.

The apparatus shown in Fig. 1 is particularly intended for handling fluids maintained under considerable pressure, and as the separating chamber A is completely closed, fluids under pressure may pass through without any appreciable pressure loss. In the apparatus disclosed, the fluid discharges at a point above the level of the inlet 4. Since the volume of fluid is continuously or intermittently being replaced by the incoming fluid, there results an upward movement which combines with the horizontal movement and results in a helical upward flow of the entire body of fluid. The end result of this combination of forces is that the solids or particles greater than a certain size or specific gravity settle to the bottom and are swept toward the center by centripetal action. Particles of a smaller size or lower specific gravity are carried continuously in suspension by the helical upward flow of the fluid, and are ultimately carried out and away by the discharging fluid.

The effect of this is practically to clarify a fluid. The extent of clarification is determined by the velocity of the fluid with respect to the size and/or specific gravity of the solids. Thus clarification of the fluid may also result in a separation of the solids into products of different sizes and/or specific gravities, and this separation may in certain cases be the purpose or function of the apparatus.

An apparatus particularly intended for classification purposes is disclosed in Figs. 3 to 5. The main container A' is in this instance divided into three parts, to wit, a lower settling chamber 15, an intermediate separating chamber 16, and an upper overflow launder 17. The intermediate chamber is provided with an inner vertically disposed spirally shaped wall 18, and a tangentially disposed inlet 19. In actual operation, there is a continuous flow over the annular lip indicated at 20, into the discharge launder 17. Hence as the fluid entering the intermediate chamber, through the tangential inlet, imparts rotational movement to the entire body of liquid or fluid, there is also a vertical movement due to the continuous overflow. The fluid enters in the direction of arrow a. At this point the area of the bottom 22 is the greatest, and so is the volume of fluid, but as the fluid rotates or travels in the direction of arrow b, the volume decreases due to the continuous upward overflow; hence as the volume decreases, velocity over the bottom would also decrease, but by providing the spirally-shaped exterior wall 18, the area decreases in proportion to loss in volume, and constant or uniform velocity over the bottom is maintained, and sanding or sedimentation is avoided.

In the operation of the apparatus shown in Figs. 3 to 5, the solids will settle to the bottom and enter chamber 15, from where they may be continuously or periodically discharged by means of a valve 24. The annular opening 9' forming communication between the intermediate chamber 16 and the lower settling chamber 15 may be formed as in Fig. 1 or by providing a cylindrical member such as shown at 25 supported from above as indicated at 26.

The extent of clarification obtained by the apparatus shown is determined by the velocity of the fluid with respect to the size or specific gravity of the solids contained; hence solids of a certain size or specific gravity will settle, while others will be carried by the upward flow and will discharge into the launder 17, from where they may be conducted by the pipe 17a to other apparatus for further treatment. Segregation of the solids may be further controlled by increasing or decreasing the diameter of the cylinder 25 with relation to the annular overflow lip, as this increases or decreases the velocity of the upwardly flowing or discharging fluid.

Figure 6:
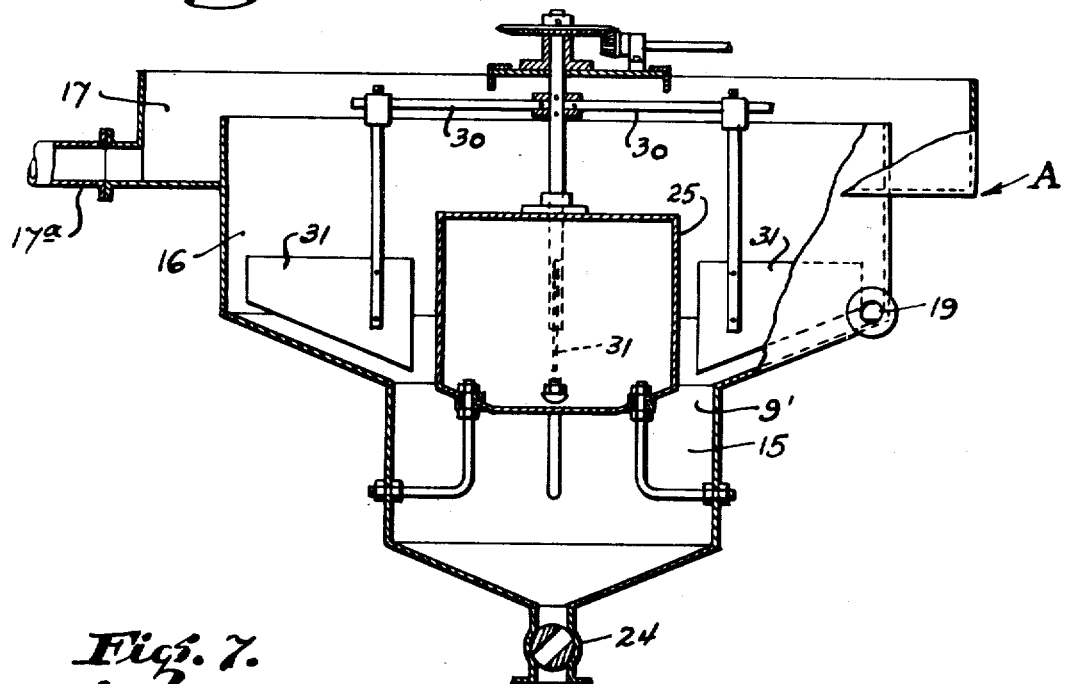
Fig. 6 is a central vertical section of still another form of the apparatus.
Figure 7:
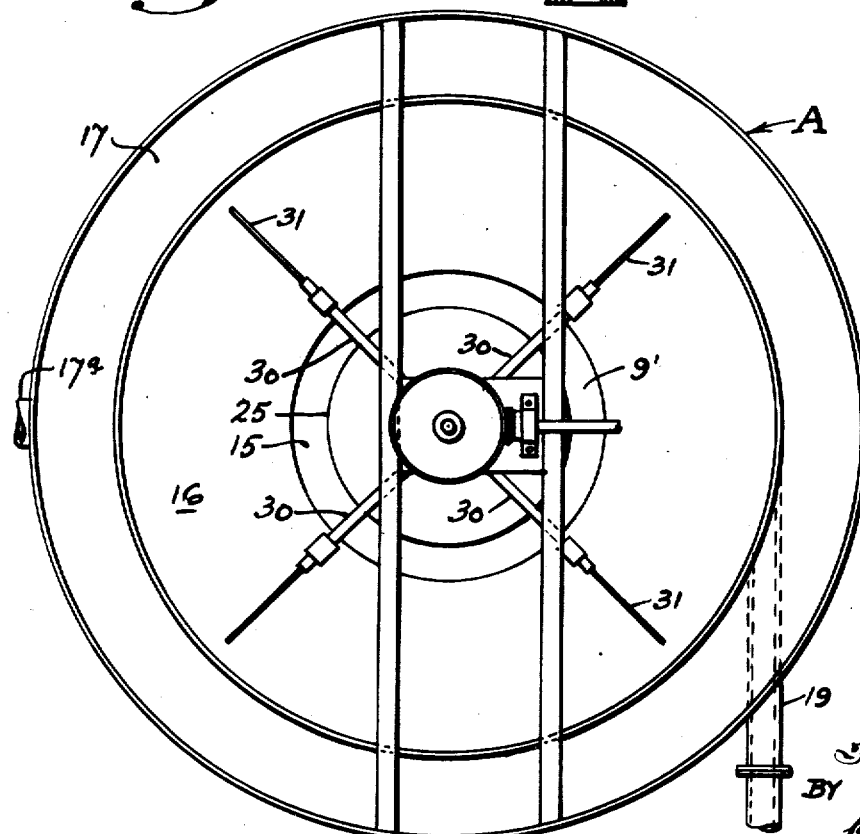
Fig. 7 is a plan view of Fig. 6.

In order to obtain the best efficiency with an apparatus of the type described, a rotational velocity within certain limits must be maintained, if centripetal action is to be secured. There are instances where the velocity or volume of the incoming fluid, or both, may be insufficient to maintain the required rotational velocity. In that event, an apparatus of the type disclosed in Fig. 6 is employed. It is similar in construction to the other apparatus already described, but differs therefrom by being provided with power-driven arms 30 on which are mounted paddles or blades 31. By rotating the arms and blades, rotational movement is imparted to the body of the fluid, and any velocity may be secured by controlling the speed of the rotating arms. Hence even through the volume and velocity of the incoming fluid may be very small, the proper velocity is maintained by the rotating arms and blades, and efficient separation or removal of solids is insured.

It will be noted that in the several structures shown, an annular flow chamber is formed between the outer wall of the apparatus and the central member indicated at 8 in Fig. 1 and at 75 in Figs. 3 and 6. One of the features of the invention is to insure as uniform a rotational velocity as possible throughout the width of the channel; i. e., the velocity of the central or inner point of a revolving body of fluid tends to become excessive, and it is for this reason that a free circular vortex is formed; the inner portion of the vortex revolving at extreme velocity, as in a whirlpool or a whirlwind. If the central member were not provided, such velocities would develop with results detrimental to an apparatus of this character, as high velocities would prevent sedimentation.

In actual practice it has been found that the diameter of the central member should be approximately one third that of the outer wall; however, this diameter may be changed, as it is desirable to vary the rotational and upward velocities in order to obtain desired results with the same or different materials. Also it has been found desirable that the central member function as a cover for the central bottom opening in the apparatus, so that material in the chamber 7 of Fig. 1, and 15 of Figs. 3 and 6, may be maintained in a condition of substantial quiescence. The central member must be spaced from the central opening to form an annular entrance opening, such as that indicated at 8 in Fig. 1 or 9' in Figs. 3 and 6, but it may be larger or smaller than the opening.

While certain features of my invention have been more or less specifically described and illustrated, I nevertheless wish it understood that changes may be resorted to within the scope of the appended claims.

Having thus described and illustrated my invention, what I claim and desire to secure by Letters Patent is:

1. An apparatus for separating solid matter from a flowing stream of fluid, comprising a vertically disposed elongated cylindrical tank which forms an outer wall, a bottom in the tank, said bottom having a central opening formed therein, a member circular in cross section spaced from said opening and extending upwardly into the tank and forming an inner wall, said member being concentric with the bottom opening in the tank and forming, with the tank, an annular flow channel, said circular member having a diameter substantially one third that of the outer wall, to prevent the formation of a vortex and to maintain a substantially uniform velocity of fluid flowing through the annular channel throughout the width of the channel, a closed chamber below the bottom of the tank but in communication with the annular channel through the central opening in the bottom of the tank, a discharge at the top of the tank, a tangentially disposed inlet in the tank, said inlet being in communication with the lower portion of the annular channel to cause entering fluid to flow around and around in the channel several revolutions before discharging from the upper end of the channel, said fluid flow being maintained at a velocity to permit centripetal action and gravitational settling of solid matter towards the bottom of the channel, and to direct the solid matter towards the opening in the bottom and to settle through said opening into the lower chamber, and means for removing the solids from the lower chamber.

2. An apparatus for separating solid matter from a flowing stream of fluid, comprising a vertically disposed elongated cylindrical tank which forms an outer wall, a bottom in the tank, said bottom having a central opening formed therein, a member circular in cross section spaced from said opening and extending upwardly into the tank to form an inner wall, said member being concentric with the bottom opening in the tank and being of substantially the same diameter, and forming with the tank an annular flow channel, said circular member and the opening in the bottom of the tank having a diameter substantially one third that of the outer wall of the tank, a closed chamber below the bottom of the tank and in communication with the annular channel through the central opening in the bottom of the tank, said circular member forming a cover for the central opening in the bottom of the tank but being spaced therefrom to form an annular opening between the tank and the closed chamber below the tank, a discharge at the top of the tank, a tangentially disposed inlet in the tank, said inlet being in communication with the lower portion of the annular channel to cause entering fluid to flow around and around in the channel several revolutions, before discharging from the upper end of the channel, said fluid flow being maintained at a velocity to permit centripetal action and gravitational settling of solid matter toward the bottom of the channel and to direct the solid matter toward the annular opening formed between the circular member and the central opening in the bottom of the tank, said annular opening permitting solid matter to enter into the lower chamber, and means for removing solids from the lower chamber.

3. An apparatus for separating solid matter from a flowing stream of fluid, comprising a vertically disposed container having a lower compartment formed therein containing a body of substantially quiescent fluid to permit settling of solid matter, a second compartment, a bottom in said compartment with a central opening formed therein to form communication with the lower compartment, a spirally shaped wall in the second compartment, a tangential inlet for admission of fluid containing solids to the second compartment, said inlet being disposed at the point where the spiral wall presents its greatest radius, said second compartment being open at the upper end and provided with an overflow lip to permit fluid entering the second compartment to rise in a spiral path and overflow the lip, a discharge launder surrounding the overflow lip to receive the overflowing fluid, and an elongated member disposed in the second compartment, said member being circular in cross section and disposed substantially centrally of the second compartment to form an annular channel between itself and the spirally shaped wall, and confining the fluid flow to the channel.

4. An apparatus for separating solid matter from a flowing stream of fluid, comprising a vertically disposed container, the outer wall of which is spirally shaped in cross section from its lower to its upper end, an annular horizontally disposed inturned flange at the upper end of the spiral wall, said flange forming a partial cover for the container, a bottom in the container with a central opening formed therein, an extension of the container below the bottom having a chamber formed therein containing a body of substantially quiescent fluid, and a tangential inlet disposed above and adjacent the bottom of the first named container for admission of fluid containing solids, said fluid when entering the container flowing in a spiral path and discharging from the upper end of the container through the outlet of smaller area, said spiral flow under the inturned flange causing centripetal diversion and permitting gravitational settling of the contained solid matter through the central opening in the bottom into the body of quiescent fluid.

5. An apparatus for separating solid matter from a flowing stream of fluid, comprising a vertically disposed container, the outer wall of which is spirally shaped in cross section from its lower to its upper end, an annular horizontally disposed inturned flange at the upper end of the spiral wall, said flange forming a partial cover for the container, a central overflow outlet of smaller area than the container, an extension on the container below the bottom having a chamber formed therein containing a body of substantially quiescent fluid, a tangential inlet disposed above and adjacent the bottom of the first named container for admission of fluid containing solids, said fluid when entering the container flowing in a spiral path and discharging from the upper end of the container through the outlet of smaller area, said spiral flow under the inturned flange causing centripetal diversion and permitting gravitational settling of the contained solid matter through the central opening in the bottom into the body of quiescent fluid, and a vertically disposed annular overflow lip connected with the inner edge of the inturned flange, said lip controlling the velocity and head of the overflow.

FRANK W. KERNS.